United States Patent
Louis et al.

(10) Patent No.: US 8,452,536 B2
(45) Date of Patent: May 28, 2013

(54) METHOD OF DEFINITION OF A NAVIGATION SYSTEM

(75) Inventors: Christian Louis, Orsay (FR); Sébastien Reynaud, Savigny sur Orge (FR)

(73) Assignee: Thales, Neuilly sur Seine (FR)

( * ) Notice: Subject to any disclaimer, the term of this patent is extended or adjusted under 35 U.S.C. 154(b) by 245 days.

(21) Appl. No.: 13/100,083

(22) Filed: May 3, 2011

(65) Prior Publication Data

US 2012/0203455 A1    Aug. 9, 2012

(30) Foreign Application Priority Data

May 5, 2010   (FR) ...................... 10 01941

(51) Int. Cl.
  *G01C 21/16*   (2006.01)
(52) U.S. Cl.
  USPC .............................. 701/505; 701/469; 342/65

(58) Field of Classification Search
  USPC   701/505, 4, 469, 468, 500, 480, 409; 342/65, 342/26 B; 340/945
  See application file for complete search history.

(56) References Cited

U.S. PATENT DOCUMENTS 7,149,629 B1 *   12/2006   Scherzinger et al. ............. 702/5

\* cited by examiner

*Primary Examiner* — Thomas Black
*Assistant Examiner* — Luke Huynh
(74) *Attorney, Agent, or Firm* — Baker Hostetler LLP

(57) ABSTRACT

A method of defining a navigation system comprising at least one inertial platform and involving terrain correlation, the estimations of the state vector of a platform being made by a navigation filter which furthermore accesses the data of an onboard map, allows the definition of the parameters relating to, respectively, the inertial platform and at least one terrain sensor allowing Terrain-Aided-Navigation, the definition of the parameters being carried out on the basis of computations carried out with the help of statistical syntheses not involving a modeling of the navigation filter.

5 Claims, 2 Drawing Sheets

METHOD OF DEFINITION OF A NAVIGATION SYSTEM

CROSS-REFERENCE TO RELATED APPLICATIONS

This application claims priority to foreign French patent application No. FR 10 01941, filed on May 5, 2010, the disclosure of which is incorporated herein by reference in its entirety.

BACKGROUND OF THE INVENTION (a) Field of the Invention

The present invention relates to a method of definition of a navigation system. It applies notably to the field of platform navigation, and more particularly to navigation systems operating notably in accordance with Terrain-Aided-Navigation methods, Terrain-Aided-Navigation being designated by the initials TAN.

(b) Description of the Related Art

Terrain-Aided-Navigation or TAN, constitutes a particular means of navigation that can be applied to a great diversity of vehicles, for example aircraft, submarines, self-guided missiles, etc.

There exist three main known means aimed at meeting the navigation requirements of platforms. The first main known means comprises inertial navigation techniques. The second main known means comprises radionavigation techniques. The third main known means comprises Terrain-Aided-Navigation techniques.

Inertial navigation consists in utilizing information provided by inertial platforms. The operation of an inertial platform is based on the Einstein-Galileo relativity principle, postulating that it is possible, without the aid of signals exterior to the platform, to measure on the one hand the speed of rotation of the platform with respect to an inertial frame of reference, for example defined by a geocentric reference frame associated with fixed stars, and on the other hand the specific force applied to the platform: typically its acceleration in the inertial frame of reference, decreased by the acceleration due to gravity. Typically, an inertial navigation system, commonly designated by the initials INS, is a device making it possible to measure these two quantities by means of sensors such as gyrometers and accelerometers, commonly three of each type, disposed along three orthogonal axes, the set of these sensors forming an inertial measurement unit commonly designated by the initials "IMU". Temporal integration of the acceleration data, and projection into the navigation reference frame on the basis of the speed of rotation data, allow the determination of the position and speed of the platform relative to the Earth, knowing an initial state of these data. However, a drawback related to temporal integration is that the error associated with the data thus determined is an increasing function of time. This error increases more than linearly, typically in an exponential manner, the variation of the error commonly being called the drift of the inertial platform. It is thus necessary, for applications requiring precision navigation, to merge the inertial measurements with other measurements of position and/or speed and/or attitude of the platform that are provided by complementary sensors, such as baroaltimeters, odometers, Pitot probes, etc., with the aim of decreasing the drift of the inertial platform. Such sensors provide information on the kinematic state of the platform without requiring any access to exterior signals or onboard maps, and are commonly called low-level sensors.

Radionavigation consists in utilizing the signals arising from beacons emitting radioelectric signals, so as to derive information regarding the positioning of the platform in relation to these beacons. A widely used radionavigation technique is the satellite-based geo-positioning technique, commonly designated according to the initials GNSS corresponding to the conventional terminology "Global Navigation Satellite System", and one of the representatives of which is the GPS technique, corresponding to the conventional terminology "Global Positioning System". One of the drawbacks specific to radionavigation techniques is related to the fact that reception of the signals originating from the beacons is not guaranteed everywhere at every moment, and may notably be affected by the geophysical environment of the platform, as well as by the surrounding electromagnetic noise, jamming techniques being able notably to jeopardize the operation of a radionavigation device. Furthermore, since the emitting beacons are maintained by operators, the integrity of the radionavigation data arising therefrom is greatly dependent on their good will. Radionavigation, and notably satellite-based geo-positioning and inertial navigation, are for example complementary navigation techniques, and a hybridization of the two techniques may turn out to be very efficient in practice. Inertial navigation indeed constitutes a very good local estimator of long-term drifting positioning, with satellite-based geo-positioning being rather unreliable over a short duration because of the aforementioned drawbacks, but not exhibiting any drift. However, in the most critical applications, and notably for military applications, it is essential to resort to other sources of information regarding position and/or speed and/or attitude of the platform so as to ensure hybridization with an inertial navigation technique. It is notably desirable that these alternative sources allow measurements of position and/or speed and/or of attitude of the platform which are autonomous, not prone to jamming, and discrete.

Terrain-Aided-Navigation or TAN consists in utilizing geophysical measurements of data delivered by an appropriate sensor, with reference data specific to a terrain of coverage of the navigation. The sensors are thus used jointly with a reference map of the terrain, also called an onboard map. These sensors allow the reading of a characteristic datum about the terrain, and Terrain-Aided-Navigation consists in comparing these values with the data of the onboard map, the onboard map being an a priori survey, obtained by appropriate means, of the values of these data over the navigation zone considered and hereinafter called data production pathway. Terrain-Aided-Navigation is particularly adapted for hybridization with an inertial navigation technique, and makes it possible to alleviate the inadequacies of radionavigation. Of course, for optimal performance, it is possible to resort to a navigation system allowing hybridization of the three aforementioned navigation techniques.

Generally, any navigation system involving terrain correlation thus comprises a plurality of onboard sensors included in the inertial platform, as well as the terrain sensor, an onboard map representing the best possible knowledge about the reality of the geophysical data that the onboard sensor must measure, and a navigation filter. The navigation filter makes it possible to arbitrate in real time, between the information provided by the inertial platform and that provided by the comparison between the measurements provided by the terrain sensor and the onboard map. The arbitration is carried out by the filter as a function of its a priori knowledge of the errors in the measurements provided. This knowledge is grouped together in error models. The error models relate to the inertial platform, the errors of the inertial platform being greater or smaller according to the quality of the equipment; the error models also relate to the terrain sensor, and also the onboard map, the errors of the latter being greater or smaller according to the quality of the data production pathway. The equipment error models originate from the information provided by the manufacturers, and/or from measurements performed via specific studies. The error models of the onboard maps are provided by the data producers.

An essential aspect of navigation is the stochastic nature of the phenomena considered. Indeed, sensors produce errors in accordance with stochastic models, and the knowledge of the geophysical data being rather uncertain, solving the problem of navigation by filtering renders the navigation performance intrinsically stochastic. Thus, the filter used in a navigation system may be considered to be an estimator of a stochastic process, that is to say to be the device which at any instant gives the dynamic state of the platform modeled as a random variable.

A first exemplary navigation system involving terrain correlation is based on the altimetric navigation technique. This technique consists in navigating an aerial platform with the aid of an inertial platform, of a terrain sensor like a radioaltimeter or a multi-beam laser scanner, measuring the distance from the platform to the terrain in one or more given direction(s), and of an onboard map of Digital Terrain Model or DTM type, charting the altitudes of points of the ground on a geolocalized regular grid.

A second exemplary navigation system involving terrain correlation is based on the bathymetric navigation technique. This technique consists in navigating a sea platform or underwater platform with the aid of an inertial platform, of a terrain sensor of mono-beam or multi-beam bathymetric sounder type, measuring the distance from the platform to the bottom of the sea in one or more given direction(s), and of an onboard map of bathymetric map type, charting the altitudes of points of the sea bed on a geolocalized regular grid.

A third exemplary navigation system involving terrain correlation is based on the gravimetric navigation technique. This technique consists in navigating an air, sea or underwater platform with the aid of an inertial platform, of a terrain sensor of gravimeter or accelerometer type, measuring the local gravity field or its anomaly, and of an onboard map of gravimetric anomaly map type, charting the values of the anomaly of the gravity field at points of the globe on a standardized regular grid.

A fourth exemplary navigation system involving terrain correlation is based on the technique of navigation by vision. This technique consists in navigating an aerial platform with the aid of an inertial platform, of a terrain sensor of onboard camera type which delivers images of the landscape overflown at a given frequency in the visible or infrared region, and of two onboard maps, an onboard map of geolocalized Orthoimage type, that is to say an image re-sampled in such a way that the effects of the relief have been deleted, that is to say an image for which the scale is the same at all points, as well as an onboard map of DTM type.

Within the framework of navigation systems involving terrain correlation, designers are notably confronted with a certain number of technical problems stated hereinbelow:

it is necessary to define a navigation system making it possible to achieve a desired navigation quality according to a set of determined performance criteria, for example guaranteeing a mean positioning error of less than a given threshold, doing so at minimal cost;

it is necessary to determine the most faithful possible error models for the inertial platform, the terrain sensor and the onboard map;

it is necessary to define the missions of a platform, notably in terms of benchmark trajectory, during a mission preparation phase, so as to determine an optimal trajectory along which the quality of the signal delivered by the terrain sensor is a maximum, the optimal trajectory having also to be defined as a function of other performance criteria of the mission of the platform and of operational constraints related to the theater of the mission. The mission preparation phase must for example be based on a navigability criterion which is relevant, that is to say representative of the richness of the signal delivered by the terrain sensor;

it is necessary to define an efficient and robust navigation filter capable of taking into consideration at best all the error models relating to the various hardware components of the system, that is to say the error of the inertial platform, of the terrain sensor and of the onboard map.

SUMMARY OF THE INVENTION

The object of the present invention is principally to solve the aforementioned technical problem, relating to the definition of a navigation system. According to techniques known from the prior art, it is necessary, with the aim of defining the specifications of a navigation system, to undertake simulation computations involving various navigation filters, and for a large number of characteristic trajectories of the platform. Probabilistic procedures, for example Monte Carlo simulations, are then necessary in view of the stochastic nature of the problem, so as to circumvent random fluctuations, with the aim of determining performance functionals. Navigation performance functionals are mathematical laws which estimate navigation performance levels in accordance with criteria, as a function of the values of the parameters specific to the inertial platform and to the terrain sensor. These functionals apply over a trajectory and depend on the characteristics of a mission, in particular inertial errors, and terrain sensor and onboard map errors. The missions to be considered are defined notably by the navigation zone considered, the trajectories to be executed in these zones, as well as the characteristics of the onboard maps used, in particular the map errors and their modeling. The use of the aforementioned probabilistic procedures exhibits the drawback of requiring the definition, prior to the computations, of determined filters. Monte Carlo simulations, for example, then have to be carried out for a large number of draws so as to reduce the random fluctuations; thus, the definition of the navigation system induces numerous and expensive simulations of navigation filters.

An aim of the present invention is to alleviate at least the aforementioned drawbacks, by proposing a method of definition of a navigation system involving terrain correlation, not requiring overly sizable timescales and costs caused by a very large number of simulations.

An advantage of the present invention is that it can be applied to all navigation systems involving terrain correlation, regardless of the environments considered, the nature of the platforms considered and terrain sensors considered.

For this purpose, the subject of the present invention is a method of definition of a navigation system comprising at least:

one navigation block comprising an inertial platform and at least one terrain sensor which are accompanied by error models, at least one onboard map accompanied by its error model, the navigation system being able to be formalized by solving the discrete-time relation:

$$\begin{cases} X_{t+1} = F_t X_t + V_t \\ Y_t = h_t(X_t) + W_t, \end{cases}$$

where the term $X_t$ comprises at least the kinematic state of the system, the initial state $X_0$ containing at least the error of the initial inertial platform modeled as a centered Gaussian random variable with covariance $P_0$; the matrix $F_t$ of the linear evolution of the state contains at least the inertial platform model used; $Y=(Y_t, t \geq 0)$ the observations vector is formed at least of the measurements of the terrain sensor; $V_t$ and $W_t$ are each centered independent Gaussian white noise with respective positive definite covariances $Q_t$ and $R_t$, said noise being mutually independent and independent of the initial state $X_0$; the term $h_t$ represents the combination of the model of the terrain sensors and of the onboard maps, the method of definition determining sets of parameters $\vec{\theta}_I$ and $\vec{\theta}_C$ respectively applicable to the inertial platform and to said at least one terrain sensor, the parameters allowing the navigation system to meet target performance criteria $C_{iobjective}$ and to satisfy constraints, the method of definition being characterized in that it comprises at least one simulation step computing performance criteria $C_i$ via performance functionals $f_i(\vec{\theta}_I, \vec{\theta}_C)$ for various pairs of parameters $(\vec{\theta}_I, \vec{\theta}_C)$ and various envisaged trajectories of the platform, followed by a step of searching for the pairs of parameters allowing the system to satisfy said target performance criteria $C_{iobjective}$, each performance functional being defined by a determined linear combination of the components of the kinematic state vector, and by a statistical synthesis pertaining to time spans $[t_1, t_2]$ determined along an envisaged trajectory, said statistical synthesis being applied to the covariance matrix arising from the Cramer-Rao bound $P_{BCR}(t)$ computed for each instant t included in the time span $[t_1, t_2]$ as the inverse of the matrix $J_t$ defined by the recurrence relation: $J_{t+1} = \Gamma_t + (Q_t + F_t \cdot J_t^{-1} \cdot F_t^T)^{-1}$, in which $Q_t$ designates the covariance matrix of the state noise comprising at least the covariance of the errors of the inertial platform, $F_t$ designates the model of evolution of the system comprising at least that of the inertial platform, and the matrix $\Gamma_t$ is computed in accordance with the relation: $\Gamma_t = \nabla_{X_t} h_t \cdot (X_{VRAlt}) \cdot R_t^{-1} \cdot \nabla_{X_t} h_t (X_{VRAlt})^T$, in which $h_t$ represents the model of said at least one terrain sensor and of the onboard map, and $X_{VRAlt}$ designates the state of the system comprising at least the inertial errors of the platform along the envisaged trajectory, $R_t$ designates the covariance matrix of the observation noise comprising at least the errors of the onboard map and of the terrain sensor.

In one embodiment of the invention, the error model of the onboard map may be a null model.

In one embodiment of the invention, the computation of the performance criteria $C_i$ can take into account spatially correlated error models of the onboard maps through a modeling of Gauss-Markov type, the state variable of the system $X_t$ then being augmented by a bias $b_t$, and the navigation system then being formalized by solving the relation:

$$\begin{cases} X_{t+1} = F_t X_t + V_t \\ b_{t+1} = -\frac{1}{\tau} b_t + u_t \\ Y_t = h_t(X_t, b_t) + W_t, \end{cases}$$

where $\tau$ designates the correlation time.

In one embodiment of the invention, the computation of the performance criteria $C_i$ can take into account spatially uncorrelated error models of the onboard maps (12) of Gaussian white noise type, said matrix $\Gamma_t$ then being defined by the relation:

$$\Gamma_t = \frac{1}{\sigma_t^2} \nabla_{X_t} h_t (X_{VRAlt}) \cdot \nabla_{X_t} h_t (X_{VRAlt})^T,$$

where $\sigma_t$ designates the standard deviation of the Gaussian additive white noise forming the onboard map error model.

In one embodiment of the invention, the computation of the performance criteria $C_i$ is carried out by fixing at zero the components of the matrices $Q_t$ of the covariance of the state noise related to the uncertainty in the measurements of the inertial platform and of the terrain sensor and $F_t$ of the covariance of the measurement noise related to the terrain sensor.

BRIEF DESCRIPTION OF THE DRAWING

Other characteristics and advantages of the invention will become apparent on reading the description, given by way of example and with regard to the appended drawings which represent.

DESCRIPTION OF THE PREFERRED EMBODIMENTS

Figure 1:
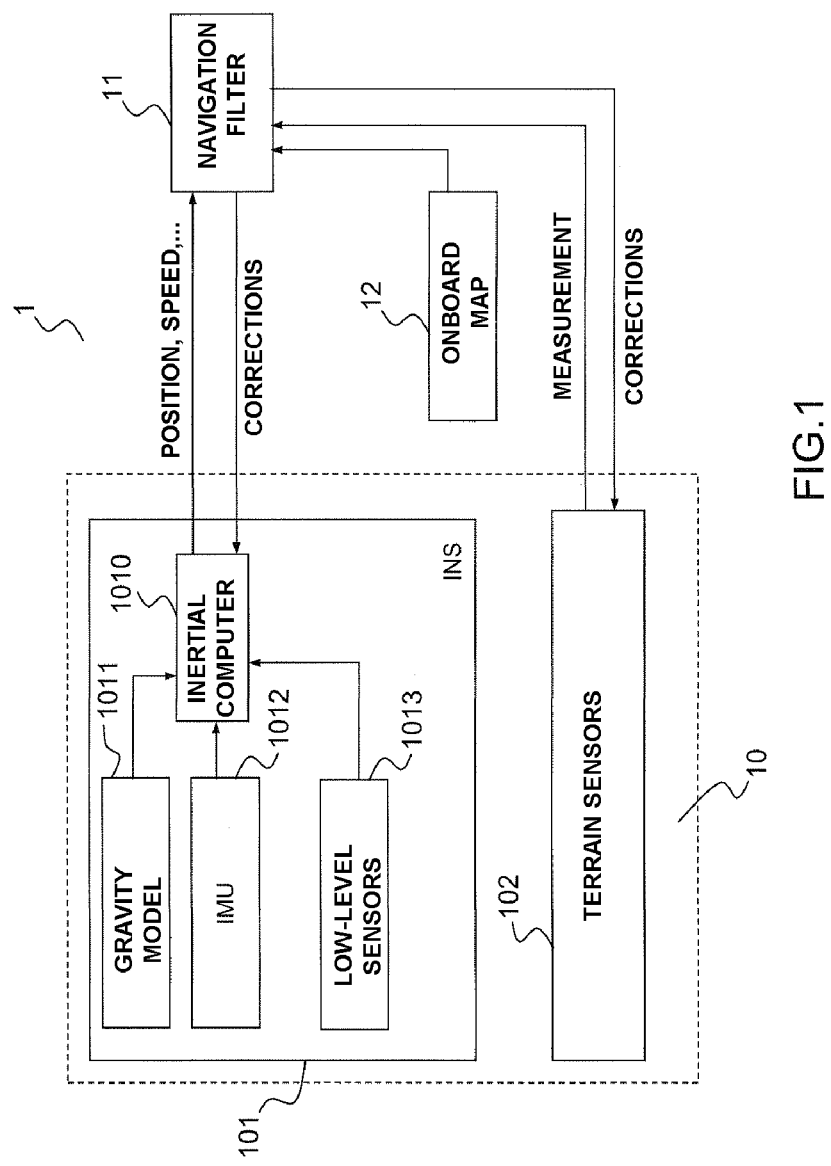
FIG. 1, a block diagram illustrating the structure of a navigation system involving terrain correlation.

FIG. 1 presents a block diagram illustrating the structure of a navigation system involving terrain correlation.

A navigation system 1 comprises a navigation block 10, a navigation filter 11 and an onboard map 12.

The navigation block 10 can comprise an inertial platform 101 and one or a plurality of terrain sensors 102. The inertial platform 101 can notably comprise an inertial computer 1010, receiving data originating from a gravity model 1011, from an IMU 1012 and from one or a plurality of low-level sensors 1013.

The navigation filter 11 receives platform position, speed and attitude data, originating from the inertial computer 1010. The navigation filter 11 receives geophysical measurements of data originating from the terrain sensors 102. Also, the navigation filter 11 accesses the data contained in the onboard map 12. The navigation filter 11 may be implemented in appropriate computation devices, and yields estimations of the kinematic state of the platform. The navigation filter 11 is also able to apply corrections to the parameters for configuring the inertial computer 1010 and terrain sensors 102 and the onboard map 12. In a typical manner, the navigation filter 11 can for example correct biases of the terrain sensors 102, or else drifts of the inertial platform 101 or else parameters of the error model of the onboard map 12.

The onboard map 12 can for example be formed by a set of various maps of various given kinds corresponding to each of the terrain sensors involved and stored in a memory.

Figure 2:
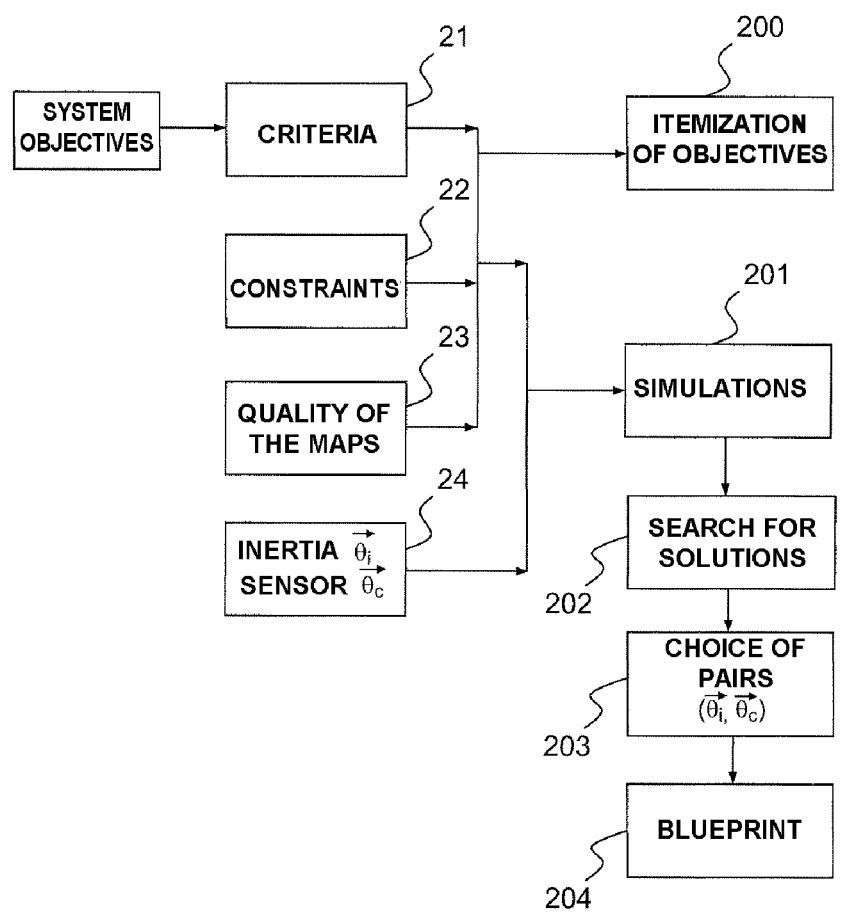
FIG. 2, a block diagram illustrating the method of definition of a navigation system, in an exemplary embodiment of the invention.

The present invention is applied to the definition of a navigation system involving terrain correlation, and notably to the determination of an optimal navigation system under given operational constraints. The aim is to determine a set of specifications, or "blueprint" of the navigation system involving terrain correlation. A blueprint can amount to a configuration of a navigation system, for example of minimum cost, and adhering to a certain number of performance objectives for a chosen spectrum of missions. The configuration is formalized by way of the parameters, which then allow the choice of appropriate hardware components of the navigation system in order to fulfill the fixed objectives. FIG. 2 illustrates the process for producing such a blueprint, according to an exemplary embodiment of the present invention.

As described previously, a navigation system comprises, within the framework of TAN, a navigation block formed by at least one pair composed of an inertial platform and of a terrain sensor. An original feature of the present invention is that it proposes to define optimal parameters for the navigation block, without consideration as to the navigation filter used.

The objectives for the navigation system must be formalized as a function of performance criteria 21, constraints 22, and also as a function of the quality of the available onboard maps 23. A step of itemizing the objectives 200 consists in itemizing the system objectives by quantifying them by target values. The objectives of the navigation system are in fact itemized into performance objectives, the performance being quantified by values or performance criteria, computed by way of performance functionals. Navigation performance functionals are mathematical laws, formulated by formal or software mathematical functions, which estimate the navigation performance levels in accordance with criteria, as a function of the values of the parameters 24 of the pair formed by the inertial platform and the terrain sensor. These values of parameters 24, in a vector manner, are denoted $(\vec{\theta}_I, \vec{\theta}_C)$, the vector 9 representing the parameters of the inertial platform, and the vector $\vec{\theta}_C$, the parameters of the terrain sensor. The performance functionals are denoted $f_i(\vec{\theta}_I, \vec{\theta}_C)$, and are computed on the basis of the navigation errors in the position, the speed or the attitude of the platform at certain instants, or on average, and their values, denoted $C_i$, are compared with "objective" threshold values defined as a function of the system dimensioning constraints envisaged, these threshold values being denoted $C_{iobjective}$. Thus, the step of itemizing the objectives 200 formalizes the system objectives in accordance with the relation:

$$\forall i \in \{1, \ldots, n\}, C_i \leq C_{iobjective} \quad (1).$$

The performance functionals apply over a trajectory and depend on the characteristics of a mission, in particular the errors of the onboard map. The missions to be considered are defined notably by:
- the navigation zone considered;
- the trajectories that the platform may have to perform in the navigation zone;
- the characteristics of the onboard maps used, in particular the map errors and their modeling;

Various steps are required in a method of definition of a navigation system involving terrain correlation, notably the following steps:

- definition of the constraints 22 of the mission;
- definition of the performance criteria $C_i = f_i(\vec{\theta}_I, \vec{\theta}_C)$ and objective thresholds $C_{iobjective}$.

The definition of the navigation block properly speaking, through its parameters $(\vec{\theta}_I, \vec{\theta}_C)$, is then performed via steps 201 to 204, with reference to FIG. 2, listed hereinbelow and described in detail hereinafter:
- a simulation step 201, during which performance criteria $C_i$ are computed for various envisaged trajectories of the platform and for various suites of parameters $(\vec{\theta}_I, \vec{\theta}_C)$, some parameters possibly being grouped into subsets of related parameters, for example as a function of the physical reality that they represent;
- a step 202 of searching for the solutions satisfying all the objective criteria;
- a step 203 of selecting the solutions determined in the search step, whose cost is a minimum. This number is at least equal to 1;
- a definition step 204, on conclusion of which the parameters $(\vec{\theta}_I, \vec{\theta}_C)$ of the navigation system are defined. This step exists only if the number of solutions of the previous step is greater than 1.

The performance criteria relate to errors in estimating certain quantities arising from specific computations forming the subject of the present invention and described in detail hereinafter. The performance criteria relate to two-dimensional or three-dimensional scalar or vector data which are always defined on the basis of linear combinations of the part of the state vector comprising the inertial errors.

Thus, a precision criterion may be defined by a given linear combination of the inertial error components of the state vector, and formulated in accordance with the following relation:

$$C_i = \sum_j A_{ij} x_j, \quad (2)$$

in which i represents the index number of the performance criterion for the project considered, $x_j$ represents the component j of the state vector, and $A_{ij}$ a vector coefficient of dimension $n_i$, $n_i$ being equal to 1, 2 or 3 depending on the dimension of the criterion.

For a simulation pertaining to a given trajectory, and for a given instant t, various types of quantities may be associated with a given performance criterion $C_i$; it is notably possible, according to techniques which are in themselves known from the prior art, to associate with a given criterion $C_i$:
- the norm of $C_i(t)$, i.e. $\|C_i(t)\|$,
- the theoretical RMS value $SC_i(t)$ of the norm of $C_i(t)$ on the basis of the covariance matrix P of the filter implemented: $SC_i(t) = \sqrt{Tr(A_i P(t) A_i^T)}$, $A_i$ being the matrix consisting of the columns $[A_{i1}, A_{i2}, \ldots]$,
- the ratio $$r_{C_i}(t) = \frac{C_i(t)}{SC_i(t)}.$$

The present invention proposes to associate with a given criterion $C_i$, the value $S_{BCR} C_i(t)$ of the norm of $C_i(t)$, computed in the same manner as the aforementioned theoretical RMS value $SC_i(t)$, but on the basis of the covariance matrix $P_{BCR}$ arising from the Cramer-Rao bound. In this way, it is not necessary to use the least navigation filter to undertake the definition of the parameters of the navigation system 1 with reference to FIG. 1, and just the definition of the parameters of the navigation block 10 suffices.

The value associated with a criterion C, may thus be written:

$$S_{BCR}C_i(t) = \sqrt{Tr(A_i P_{BCR}(t) A_i^T)} \quad (3),$$

where:

$P_{BCR}$ is the covariance matrix arising from the Cramer-Rao bound, and $A_i$ the matrix consisting of the columns $[A_{i1}, A_{i2}, \ldots]$.

A few essential elements relating to the Cramer-Rao bound are recalled here: the Cramer-Rao bound makes it possible to obtain a lower bound on the precision with which it is possible to ascertain the estimated variables, for example the position, the speed and the attitude of a platform on the basis of measurements, performed by the terrain sensor, of the geophysical characteristics of its environment, of the onboard map and of the inertial platform. Thus, the Cramer-Rao bound depends on the parameters of the inertial platform, the terrain sensors, the quality of the onboard maps as well as the environment seen by these sensors during the trajectory followed by the platform. By writing the problem expressed as a state model in discrete time indexed by t, the estimation of the state vector $X_t$ comprising at least the inertial errors in position, speed and attitude, can be formulated in accordance with the following relation:

$$\begin{cases} X_{t+1} = F_t X_t + V_t \\ Y_t = h_t(X_t) + W_t, \end{cases} \quad (4)$$

where the term $X_t$ comprises at least the kinematic state of the system, that is to say in particular the errors of the inertial platform in position, speed and attitude, $X_0$ containing at least the error of the initial inertial platform modeled as a centered Gaussian random variable with covariance $P_0$; the matrix $F_t$ of the linear evolution of the state contains at least the inertial platform model used; $Y = (Y_t, t \geq 0)$ the observations vector is formed at least of the measurements of the terrain sensor of the TAN; the terms $V_t$ (which represents the measurement noise related to the sensors of the inertial platform) and $W_t$ (containing, inter alia, the noise related to the terrain sensor as well as the noise related to the error of the onboard map) are centered independent Gaussian white noise with respective positive definite covariances $Q_t$ and $R_t$. Both noise terms are mutually independent and independent of $X_0$; the term $h_t$ represents the combination of the model of the sensors and of the available onboard maps used.

The recursive expression serving for the computation of the Cramer-Rao bound can then be written in accordance with the following relation:

$$J_{t+1}(X_{t+1}) = E[\nabla_{X_{t+1}} h_{t+1}^T(X_{tk+1})] R_{t+1}^{-1} [\nabla_{X_{t+1}} h_{t+1}^T (X_{tk+1})]^T + (Q_t + F_t(X_t) J_t^{-1} F_t^T(X_t))^{-1} \quad (5),$$

where:

$J_t$ is the Fisher information matrix associated with the estimation problem considered, that is to say the inverse of the Cramer-Rao bound.

Various statistical syntheses may be computed on the basis of the value $S_{BCR}C_i$ given by relation (3) hereinabove, for example:

the mean,
the standard deviation,
the quadratic mean,
the maximum value,
the minimum value.

It is necessary for the statistical syntheses to pertain to a defined time span, that is to say to a set of defined time intervals, a time interval possibly being reduced to a point.

Thus, the definition of a performance functional consists in defining:

the desired linear combination of the state vector, that is to say the coefficients $A_{ij}$, some of these coefficients being defined by default,
the type of temporal statistical synthesis desired, denoted Stat hereinafter,
the time span $[t_1, t_2]$ over which the statistical synthesis applies.

Among the so-called generic criteria defined by a constant linear combination of the coordinates of the state vector, the method of definition according to the present invention affords access to the conventional criteria which are for each of the position, speed and attitude, the criteria: north, east, altimetric, 2D (or planimetric) and 3D.

It is then possible to denote hereinafter a performance functional determined as defined hereinabove as a functional dependent on the parameters of the TAN system, that is to say the set of parameters defining the inertial platform and the terrain sensors:

$$P_i(\theta_1, \theta_2, \ldots, \theta_k),$$

where $P_i$ is the performance criterion as defined previously (for example: a north position error of the platform, etc.), and $\theta_1, \theta_2, \theta_k$, terms of models encompassing all the parameters of the TAN system.

The general procedure for computing a performance functional can then be split into two distinct steps described hereinbelow:

a first step consisting in computing for all the instants t along a considered trajectory, the covariance matrix arising from the Cramer-Rao bound, $P_{BCR}(t)$ of dimension $n \times n$ if n is the number of components of the kinematic state vector;

a second step consisting in applying the performance functional considered, defined by A, the matrix consisting of the columns $[A_1, A_2, \ldots]$ and the statistical synthesis $Stat(t_1, t_2)$ adopted between two instants $t_1$ and $t_2$, to the Cramer-Rao bound $P_{BCR}(t)$ computed via relation (3) hereinabove:

$$S_{BCR}C(t) = \sqrt{Tr(A_i P_{BCR}(t) A_i^T)},$$

and then:

$$P_i(\theta_1, \theta_2, \ldots, \theta_k) = Stat(t_1, t_2)[S_{BCR}C(t)] \quad (6).$$

The computation of the covariance matrix arising from the Cramer-Rao bound is then done on the basis of the input data listed hereinbelow:

the trajectory,
the nature of the terrain, read from the onboard map optionally furnished with its error model,
the errors of the terrain sensor,
the errors of the inertial platform.

Thus, one of the advantages of the present invention is related to the fact that the performance functionals are notably dependent upon the platform's trajectories, rather than solely dependent on the characteristics of the terrain.

The TAN may be treated as a filtering problem. In this case, the general system of equations may be formulated according to the previously stated relation (4).

Advantageously, it is possible to take map errors into account. Taking map errors into account requires that the deterministic nature of the function $h_t$ be abandoned. Indeed, this function depends on the true terrain which, in the mission preparation phase, is not known perfectly. In fact, only the available onboard maps, which are only a representation thereof marred by errors, are known. Denoting by $Z_M$ the vector representing the onboard map forming an abstraction of the stochastic true terrain Z, the terrain Z is then related to the onboard map $Z_M$ in accordance with the relation:

$$Z(x,y) = Z_M(x,y) + \epsilon(x,y) \quad (7),$$

where:

$\epsilon$ designates the map error with probability law $p_\epsilon$. The formalism thus adopted allows the consideration of the onboard map error fields $\epsilon(x, y)$, in particular the consideration of map error fields which do not correspond to Gaussian white noise.

The estimation of the kinematic state of the platform then arises as a problem of filtering $X_t$ on the basis of the processes $(Y_t, Z)$, where $Z=Z(x,y)$.

This formulation of the problem makes it possible to compute the Cramer-Rao bound defined by the evolution equation formulated previously in relation (5). It is recalled here that the procedures known from the prior art make it necessary to perform very many Monte Carlo simulations so as to model arbitrary onboard map errors, thereby involving sizable costs and times of simulation computations, and making it necessary to have a fast mechanism for simulating true terrains $Z_i$ around the onboard map. Several simplifying procedures may be envisaged, using notably:

either a small number of draws of the true terrain, possibly even reducing to 1: such a simplification amounts to considering the true terrain identical to the onboard map and therefore not considering any map error;

or simplifying assumptions about the probability law $p_\epsilon$ of the onboard map error field $\epsilon(x, y)$; two simple models make it possible to avoid too large a number of draws: the conventional Gaussian white noise model and the random field model of Gauss-Markov type. In both these cases, the function $h_t$ becomes deterministic again. In the first case, with the Gaussian white noise model, the map noise is added to the observation noise $W_t$. In the second case, with the random field model of Gauss-Markov type, the state $X_t$ may be augmented by the map error with the aim of taking this auto-correlated map noise model into account.

In the case of the second point hereinabove, that is to say in the case of the simplifying assumptions about the probability law $p_\epsilon$ of the onboard map error field $\epsilon(x, y)$, which lead to the use of models of Gaussian white noise or Gauss-Markov type, the effective computation of the Cramer-Rao bound $P_{BCR}(t)$ for any instant t is then performed on the basis of the following input data:

the trajectory followed by the platform, defined as a function of time t, denoted by $X_{TRUEt}$ for any instant t, the onboard map representing the navigation terrain, as well as a model of its errors, the onboard TAN system, that is to say the sensor model considered, and the model of the inertial platform considered, or stated otherwise the models of the errors of the terrain sensor included in $W_t$ and of the inertial platform included in $V_t$.

The computation of the covariance matrix arising from the Cramer-Rao bound is then simplified, and can be split into two sub-steps described hereinafter, for any instant t:

a first sub-step of computing the contribution of the navigation terrain in terms of information, which can be formulated in accordance with the following relation, by designating by $X_{TRUEt}$ the position of the platform at the instant t, by $h_t$ the deterministic observation function for the sensor and by $R_t$ the sum of the possible errors of the onboard map and of those of the terrain sensor:

$$\Gamma_t = \nabla_{X_t} h_t(X_{VRAIt}) \cdot R_t^{-1} \cdot \nabla_{X_t} h_t(X_{VRAIt})^T \quad (8);$$

a second sub-step of propagating the recurrence, initialized to $J_0 = P_0^{-1}$, formulated by the following relation:

$$J_{t+1} = \Gamma_t + (Q_t + F_t \cdot J_t^{-1} \cdot F_t^T)^{-1} \quad (9),$$

where:

$Q_t$ contains the covariance matrix of the errors of the inertial platform.

The Cramer-Rao bound at the instant t is then estimated by $P_t = J_t^{-1}$.

This first step of computing a performance functional, the most expensive in the overall computation, represents a computational cost equivalent to the execution of a Kalman filter on the trajectory considered.

It is then possible, on completion of the first computation step described hereinabove, to undertake the second aforementioned step of computing a performance functional, described in detail hereinafter.

On completion of the first step, the covariance matrix $P_{BCR}(t)$ arising from the Cramer-Rao bound is available for any instant t included in the interval $[t_1, t_2]$ on the trajectory considered.

By assuming that the performance criterion is defined by the matrix A consisting of the columns $[A_1, A_2, \ldots]$ and of the statistic $Stat(t_1, t_2)$ considered between the instants $t_1$ and $t_2$, then the second step reduces to a quasi-instantaneous computational step amounting to solving the following relation, corresponding to relation (6) hereinabove:

$$S_{BCR}C(t) = \sqrt{Tr(AP_{BCR}(t)A^T)},$$

and then:

$$P_i(\theta_1, \theta_2, \ldots, \theta_k) = Stat(t_1, t_2)[S_{BCR}C(t)] \quad (10).$$

The cost of the second step, in terms of computation, is negligible.

The step 202 of searching for the solutions satisfying a determined criterion is now described in detail, according to an exemplary embodiment.

The search step 202 can carry out an optimization according to an algorithm for systematic searching within the discretized universe of the parameters. Such an algorithm requires only the ability to compute the functionals involved and not computations of gradients.

The algorithm can for example be a multi-scale algorithm. It should be observed that it is of course also not indispensable to resort to a multi-scale algorithm, and it is possible to restrict the computations to a single pass. Resorting to a multi-scale algorithm may however turn out to be advantageous, since it may be preferable to increase the number of steps in the multi-scale algorithm, rather than to discretize each group of parameters in a fine manner, thereby exponentially increasing the cost in terms of computation. The multi-scale algorithm may be designed in the manner described hereinbelow:

At scale 1, the algorithm computes all the values of the functionals at all the points of the discretization of the search space. Thus, the cost of the algorithm is almost independent of the number of functionals to be treated. Thereafter, it is possible to select the configuration exhibiting the least cost from among the configurations which satisfy the objective criteria. Two cases may then arise: the favorable case is that where at least one configuration meets the criteria. In this case, the algorithm delivers the minimum cost configuration. The unfavorable case is that where no tested configuration satisfies the objective criteria. In this case, the algorithm cannot deliver any minimum cost configuration at this juncture, and it is necessary:

either to increase the number of classes in the groups studied;

or to redefine the extreme values of the intervals.

The second of the two aforementioned options may turn out to be advantageous, since the functionals being in general monotonic, it is rare for them to possess extrema in the middle of the regions of study but rather at the ends.

Thus, it is necessary to ensure that at least one extreme configuration satisfies the constraints of the performance functionals. Accordingly, there exist tools, in themselves known, for plotting curves, notably so-called "iso performance" curves, which make it possible to ensure that a minimum exists.

If a minimum configuration has thus been found, it is then possible to refine the search around this configuration so as to determine it more precisely by going in a following step to a smaller scale around this configuration.

At scale n+1, the number of classes is unchanged but the new intervals of variation, centered on the value found, are reduced, and the process of the previous step is resumed.

The overall cost in terms of computation, of the search step 202, is thus linear in the number of steps.

Thus, an advantage of the present invention is that it makes it possible to define an optimal configuration of a navigation system involving Terrain-Aided-Navigation, as a function of a series of typical missions, without requiring expensive simulations of navigation filters. Indeed, it suffices to compute the Cramer-Rao bounds on each of the trajectories.

One other advantage of the present invention is that it allows optimizing the cost of the different system configurations determined thanks to the present invention, each of these configurations being possibly associated to a cost, for example determined following a known cost determination algorithm.

Advantageously, it is possible to take into account a particular model of map error, for example with a spatial correlation, for the computation of the Cramer-Rao bound according to one of the previously described embodiments of the invention.

Taking account of a spatially correlated map error in the computation of the Cramer-Rao bound and in navigation filters makes it possible notably to define a more robust navigation system.

Among the map error models handled, the most general case is the model of Gauss-Markov type defined by a pair $(\sigma, d)$. For this type of model, the computation of the Cramer-Rao bound can be done explicitly by taking account of an additional dimension in the state vector of the system, by virtue of a few assumptions which are not restrictive for the cases treated within the TAN framework. The computation of the Cramer-Rao bound in the case of a model of Gauss-Markov type is recalled hereinafter.

TAN may be treated as a problem of filtering. The general system may be cast into the particular form of the previously stated relation (4):

$$\begin{cases} X_{t+1} = F_t X_t + V_t \\ Y_t = h_t(X_t) + W_t. \end{cases} \quad (4)$$

The terrain Z may be related to the onboard map $Z_M$ according to the previously stated relation (7):

$$Z(x,y) = Z_M(x,y) + \epsilon(x,y) \quad (7).$$

In the case where the onboard map error $\epsilon(x, y)$ follows a law of spatial stationary and isotropic Gauss-Markov type defined by the pair $(\sigma, d)$, under the assumption that the speed vector of the platform varies slowly, represented by the double assumption made in the TAN applications treated within the system upstream definition, namely the following assumptions:

the norm of the speed of the platform varies slowly,
the trajectories of the platform are locally rectilinear.

The spatial random field $\epsilon(x, y)$ can be represented by a temporal process $b_t$ such that $b_t = \epsilon(f(t))$, where $(x, y) = f(t) = (x_0, y_0) + \vec{v}_t$. According to the assumptions adopted, the process $b_t$ follows a law of temporal Gauss-Markov type. Stated otherwise, $b_t$ follows the following differential equation:

$$\dot{b}_t = -\frac{1}{\tau} b_t + u_t, \quad (11)$$

where:

$\tau$ is the process correlation time and the term $u_t$ represents centered Gaussian exciter white noise of constant standard deviation $\sqrt{q}$.

The relations between the parameters of the spatial Gauss-Markov $(\sigma, d)$ and those of the temporal Gauss-Markov $(\sqrt{q}, \tau)$ can be written in accordance with the following relation:

$$\begin{cases} \sigma^2 = \frac{q\tau}{2} \\ d = v\tau. \end{cases} \quad (12)$$

With the aim of taking the map error model into account, it is then possible to augment the state vector $X_t$ by supplementing it with the bias variable $b_t$ so as to obtain the new discretized TAN system, formalized by the following relation:

$$\begin{cases} X_{t+1} = F_t X_t + V_t \\ b_{t+1} = -\frac{1}{\tau} b_t + u_t \\ Y_t = h_t(X_t, b_t) + W_t. \end{cases} \quad (13)$$

With this new TAN system, the estimation of the state then arises as a problem of filtering $X_t$ on the basis of the processes $(Y_t)$, since henceforth $Z(x, y) = Z_M(x, y)$ is no longer of a stochastic nature.

For this TAN system, the Cramer-Rao bound can then be written with the formalism of relation (5) hereinabove, by using a state augmented by the bias $b_t$, so as to thus allow complete treatment of a modeling of spatial Gauss-Markov type of the onboard map errors.

Advantageously, it is possible to also take into account the errors related to the trajectories, to the terrain and to the onboard map. By assuming that the only uncertainties—apart from those regarding the initial kinematic state of the platform—occurring in the determination of the position of the platform along a given trajectory, are those related to the error of the onboard map used for navigation, then the expression for the bound given by relation (5) is simplified by fixing at zero the components of the matrices $Q_t$ of the covariance of the state noise related to the uncertainty in the inertial and sensor measurements and $F_t$ of the covariance of the measurement noise related to the terrain sensor. More precisely, all the state noise is canceled. In particular, the Markovian noise, if any, handled through evolution equations of the type $$\frac{dX}{dt} = -\frac{1}{\tau}x + u,$$

becomes an exponentially convergent process handled by $$X(t) = X_0 e^{-\frac{t}{\tau}}.$$

It therefore tends rapidly to zero. These terms are retained in the equations so as to keep the same modeling of the problem. Their influence, even though it can only increase the value of the bound at least at the start, may seem a priori negligible, but by retaining these terms, any comparison with results of navigation filters can be rendered more exact.

The computation of the performance is performed in a manner similar to the embodiments presented previously.

In the case where the map error is not spatially correlated, it is possible to take into account a map error modeling by Gaussian additive white noise of standard deviation $\tau_t$.

The recursive equation for the Cramer-Rao bound then has its term:

$$\Gamma_t = \nabla_{X_t} h_t(X_{VRAlt}) \cdot R_t^{-1} \cdot \nabla_{X_t} h_t(X_{VRAlt})^T \quad (8)$$

simplified in accordance with the following relation:

$$\Gamma_t = \frac{1}{\sigma_t^2} \nabla_{X_t} h_t(X_{VRAlt}) \cdot \nabla_{X_t} h_t(X_{VRAlt})^T. \quad (14)$$

Also, it is possible to simplify the computations by considering that the uncertainties, in addition to those regarding the kinematic state at the start, occurring in the determination of the position of the platform along a given trajectory, are those related to the error of the onboard map used for navigation as well as those related to the sensor measurement error. The general expression for the Cramer-Rao bound can then be simplified by canceling the components of the matrices $Q_t$ of the covariance of the state noise related to the inertial measurement uncertainty.

The Markovian noise, if any, can then be in a manner similar to the embodiments previously described.

Designating by $\tilde{Q}_t^*$ the state noise covariance matrix thus obtained, which is not zero for example in the case where an auto-correlation is modeled in the terrain sensor measurement error, it is possible to formulate the Cramer-Rao bound according to the following recursive relation:

$$J_{t+1} = \Gamma_{t+1} + (\tilde{Q}_t^* + F_t \cdot J_t^{-1} \cdot F_t^T)^{-1} \quad (15),$$

where $$\Gamma_t = \nabla_{X_t} h_t(X_{VRAlt}) \cdot R_t^{-1} \cdot \nabla_{X_t} h_t(X_{VRAlt})^T \quad (8)$$

Relation (8) recalled hereinabove comprises an additional term, relative to relation (14), representing the loss of information related to the state noise corresponding to the modeling of the measurement of the terrain sensor.

The invention claimed is:

1. A method of definition of a navigation system comprising:
    one navigation block comprising an inertial platform and at least one terrain sensor which are accompanied by error models,
    at least one onboard map accompanied by its error model,
    the navigation system (1) being formalized by solving the discrete-time relation:

$$\begin{cases} X_{t+1} = F_t X_t + V_t \\ Y_t = h_t(X_t) + W_t, \end{cases}$$

where
    the term $X_t$ comprises at least the kinematic state of the system, the initial state $X_0$ containing at least the error of the initial inertial platform modeled as a centered Gaussian random variable with covariance $P_0$; the matrix $F_t$ of the linear evolution of the state contains at least the inertial platform model used; $Y=(Y_t, t\geq 0)$ the observations vector is formed at least of the measurements of the terrain sensor; $V_t$ and $W_t$ are each centered independent Gaussian white noise with respective positive definite covariances $Q_t$ and $R_t$, said noise being mutually independent and independent of the initial state $X_0$; the term $h_t$ represents the combination of the model of the terrain sensors and of the onboard maps,
    the method of definition determining sets of parameters $\vec{\theta}_I$ and $\vec{\theta}_C$ respectively applicable to the inertial platform and to said at least one terrain sensor, the parameters allowing the navigation system to meet target performance criteria $C_{iobjective}$ and to satisfy constraints, the method of definition further comprising at least one simulation step computing performance criteria $C_i$ via performance functionals $f_i(\vec{\theta}_I, \vec{\theta}_C)$ for various pairs of parameters $(\vec{\theta}_I, \vec{\theta}_C)$ and various envisaged trajectories of the platform, followed by a step of searching for the pairs of parameters allowing the system to satisfy said target performance criteria $C_{iobjective}$, each performance functional being defined by a determined linear combination of the components of the kinematic state vector, and by a statistical synthesis pertaining to time spans $[t_1, t_2]$ determined along an envisaged trajectory, said statistical synthesis being applied to the covariance matrix arising from the Cramer-Rao bound $P_{BCR}(t)$ computed for each instant t included in the time span $[t_1, t_2]$ as the inverse of the matrix $J_t$ defined by the recurrence relation: $J_{t+1} = \Gamma_t + (Q_t + F_t \cdot J_t^{-1} \cdot F_t^T)^{-1}$, in which $Q_t$ designates the covariance matrix of the state noise comprising at least the covariance of the errors of the inertial platform, $F_t$ designates the model of evolution of the system comprising at least that of the inertial platform, and the matrix $\Gamma_t$ is computed in accordance with the relation: $\Gamma_t = \nabla_{X_t} h_t \cdot (X_{TRUE_t}) \cdot R_t^{-1} \cdot \nabla_{X_t} h_t (X_{TRUE_t})^T$, in which $h_t$ represents the model of said at least one terrain sensor and of the onboard map, and $X_{TRUE_t}$ designates the state of the system comprising at least the inertial errors of the platform along the envisaged trajectory, $R_t$ designates covariance matrix of the observation noise comprising at least the errors of the onboard map and of the terrain sensor.

2. The method according to claim 1, wherein the error model of the onboard map is a null model.

3. The method according to claim 1, wherein the computation of the performance criteria $C_i$ takes into account spatially correlated error models of the onboard maps through a modeling of Gauss-Markov type, the state variable of the system $X_t$ then being augmented by a bias $b_t$, and the navigation system then being formalized by solving the relation:

$$\begin{cases} X_{t+1} = F_t X_t + V_t \\ b_{t+1} = -\frac{1}{\tau} b_t + u_t \\ Y_t = h_t(X_t, b_t) + W_t, \end{cases}$$

where: $\tau$ designates the correlation time.

4. The method according to claim 1, wherein the computation of the performance criteria $C_i$ takes into account spatially uncorrelated error models of the onboard maps of Gaussian white noise type, said matrix $\Gamma_t$ then being defined by the relation:

$$\Gamma_t = \frac{1}{\sigma_t^2} \nabla_{X_t} h_t(X_{VRAlt}) \cdot \nabla_{X_t} h_t(X_{VRAlt})^T,$$

where $\sigma_t$ designates the standard deviation of the Gaussian additive white noise forming the onboard map error model.

5. The method according to claim 1, characterized in that the computation of the performance criteria $C_i$ is carried out by fixing at zero the components of the matrices $Q_t$ of the covariance of the state noise related to the uncertainty in the measurements of the inertial platform and of the terrain sensor and $F_t$ of the covariance of the measurement noise related to the terrain sensor.

\* \* \* \* \*